United States Patent
Babb et al.

(10) Patent No.: US 12,471,994 B2
(45) Date of Patent: Nov. 18, 2025

(54) SYSTEMS AND METHODS FOR FACILITATING INSERTION OF A SURGICAL INSTRUMENT INTO A SURGICAL SPACE

(71) Applicant: Intuitive Surgical Operations, Inc., Sunnyvale, CA (US)

(72) Inventors: Marisa C. Babb, Santa Clara, CA (US); Craig Gotsill, San Francisco, CA (US); Sophia R. Hannaford, Palo Alto, CA (US); Brandon D. Itkowitz, San Jose, CA (US); Jason S. LaFrenais, San Jose, CA (US); Daniel W. Nissenbaum, San Francisco, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 687 days.

(21) Appl. No.: 17/426,603

(22) PCT Filed: Jan. 29, 2020

(86) PCT No.: PCT/US2020/015653
§ 371 (c)(1),
(2) Date: Jul. 28, 2021

(87) PCT Pub. No.: WO2020/160129
PCT Pub. Date: Aug. 6, 2020

(65) Prior Publication Data
US 2022/0117662 A1    Apr. 21, 2022

Related U.S. Application Data

(60) Provisional application No. 62/799,258, filed on Jan. 31, 2019.

(51) Int. Cl.
*A61B 34/10* (2016.01)
*A61B 34/00* (2016.01)
*A61B 90/00* (2016.01)

(52) U.S. Cl.
CPC .............. *A61B 34/10* (2016.02); *A61B 34/70* (2016.02); *A61B 90/37* (2016.02); *A61B 2034/102* (2016.02); *A61B 2034/107* (2016.02)

(58) Field of Classification Search
CPC ......... A61B 34/10; A61B 34/70; A61B 90/37; A61B 2034/102; A61B 2034/107
(Continued)

(56) References Cited

U.S. PATENT DOCUMENTS 4,064,608 A    12/1977    Jaeger
6,064,904 A *  5/2000    Yanof .................... A61B 90/36
                                                     606/130
(Continued)

FOREIGN PATENT DOCUMENTS

CA    2742260 A1    5/2010
CA    2633137 C  * 10/2012    ............. A61B 34/75
(Continued)

OTHER PUBLICATIONS

International Search Report and Written Opinion for Application No. PCT/2020/015653, mailed Apr. 30, 2020, 13 pages.
(Continued)

*Primary Examiner* — Michael J Lau

(57) ABSTRACT

An exemplary system determines an insertion trajectory that a surgical instrument is positioned to follow when inserted into a surgical space. The system provides, for display by a display device, an image that depicts a portion of the surgical space captured by an imaging device and at least a portion of a representation of the insertion trajectory in the surgical space.

20 Claims, 11 Drawing Sheets

(58) Field of Classification Search
USPC .......................................................... 606/1
See application file for complete search history.

(56) References Cited

U.S. PATENT DOCUMENTS

| | | | |
|---|---|---|---|
| 6,591,130 | B2 | 7/2003 | Shahidi |
| 6,645,196 | B1 | 11/2003 | Nixon et al. |
| 7,239,330 | B2 | 7/2007 | Sauer et al. |
| 7,774,044 | B2 | 8/2010 | Sauer et al. |
| 8,473,031 | B2 | 6/2013 | Nixon et al. |
| 8,864,652 | B2 | 10/2014 | Diolaiti et al. |
| 9,326,660 | B2 | 5/2016 | Akimoto et al. |
| 9,645,785 | B1 | 5/2017 | Hannaford et al. |
| 9,661,991 | B2 * | 5/2017 | Glossop ................ A61B 5/065 |
| 9,681,925 | B2 | 6/2017 | Azar et al. |
| 9,718,190 | B2 | 8/2017 | Larkin et al. |
| 9,767,608 | B2 | 9/2017 | Lee et al. |
| 9,789,608 | B2 | 10/2017 | Itkowitz et al. |
| 9,818,231 | B2 | 11/2017 | Coffey et al. |
| 9,892,564 | B1 | 2/2018 | Cvetko et al. |
| 9,980,780 | B2 | 5/2018 | Lang |
| 10,008,017 | B2 | 6/2018 | Itkowitz et al. |
| 10,010,379 | B1 | 7/2018 | Gibby et al. |
| 10,130,429 | B1 * | 11/2018 | Weir ...................... A61B 34/76 |
| 10,137,575 | B2 | 11/2018 | Itkowitz et al. |
| 10,235,757 | B2 | 3/2019 | Hu et al. |
| 10,579,135 | B2 | 3/2020 | Urbach et al. |
| 10,639,104 | B1 | 5/2020 | Barral et al. |
| 12,059,124 | B2 | 8/2024 | Shelton, IV et al. |
| 2006/0189842 | A1 | 8/2006 | Hoeg et al. |
| 2006/0281971 | A1 | 12/2006 | Sauer et al. |
| 2007/0021738 | A1 | 1/2007 | Hasser et al. |
| 2007/0236514 | A1 | 10/2007 | Agusanto et al. |
| 2008/0065109 | A1 * | 3/2008 | Larkin .................... A61B 34/71 901/14 |
| 2008/0071292 | A1 * | 3/2008 | Rich ...................... A61B 90/36 606/130 |
| 2010/0076305 | A1 * | 3/2010 | Maier-Hein ............. A61B 6/12 600/426 |
| 2011/0034798 | A1 | 2/2011 | Payner |
| 2013/0038707 | A1 | 2/2013 | Cunningham et al. |
| 2014/0078138 | A1 | 3/2014 | Martin et al. |
| 2015/0366628 | A1 | 12/2015 | Ingmanson |
| 2016/0015469 | A1 | 1/2016 | Goshayesh et al. |
| 2016/0191887 | A1 | 6/2016 | Casas |
| 2016/0235486 | A1 * | 8/2016 | Larkin ................... A61B 34/20 |
| 2016/0287337 | A1 | 10/2016 | Aram et al. |
| 2017/0056115 | A1 * | 3/2017 | Corndorf ............... A61N 1/372 |
| 2017/0099479 | A1 | 4/2017 | Browd et al. |
| 2017/0128041 | A1 | 5/2017 | Hasser et al. |
| 2017/0128144 | A1 | 5/2017 | Hasser et al. |
| 2017/0128145 | A1 | 5/2017 | Hasser et al. |
| 2017/0135775 | A1 | 5/2017 | Cunningham et al. |
| 2017/0172696 | A1 | 6/2017 | Saget et al. |
| 2017/0209232 | A1 | 7/2017 | Larkin et al. |
| 2017/0210012 | A1 | 7/2017 | Larkin et al. |
| 2017/0213387 | A1 | 7/2017 | Bean et al. |
| 2017/0305016 | A1 | 10/2017 | Larkin et al. |
| 2017/0344674 | A1 | 11/2017 | Mccloskey et al. |
| 2017/0348061 | A1 * | 12/2017 | Joshi ..................... A61B 90/90 |
| 2018/0032130 | A1 | 2/2018 | Meglan |
| 2018/0116732 | A1 | 5/2018 | Lin et al. |
| 2018/0140362 | A1 | 5/2018 | Cali et al. |
| 2018/0271603 | A1 | 9/2018 | Nir et al. |
| 2018/0286135 | A1 | 10/2018 | Jagga et al. |
| 2018/0318009 | A1 * | 11/2018 | Sohlden ................ A61B 90/96 |
| 2019/0008595 | A1 * | 1/2019 | Popovic ................ A61B 34/20 |
| 2019/0088162 | A1 | 3/2019 | Meglan |
| 2019/0156402 | A1 | 5/2019 | Greenberger et al. |
| 2019/0183576 | A1 | 6/2019 | Fahim et al. |
| 2019/0231453 | A1 | 8/2019 | Carnes et al. |
| 2020/0054412 | A1 | 2/2020 | Fuerst et al. |
| 2020/0078103 | A1 | 3/2020 | Duindam et al. |
| 2021/0228282 | A1 * | 7/2021 | Dimaio ................. G06T 19/006 |
| 2021/0338366 | A1 | 11/2021 | Payyavula et al. |
| 2021/0343088 | A1 | 11/2021 | Payyavula et al. |
| 2022/0175473 | A1 * | 6/2022 | Feather .................... G06T 15/40 |
| 2022/0192776 | A1 | 6/2022 | Gibby et al. |
| 2023/0126545 | A1 * | 4/2023 | Liu .......................... A61B 8/08 382/128 |
| 2023/0139425 | A1 * | 5/2023 | Shademan ............. A61B 90/37 700/245 |
| 2023/0293259 | A1 | 9/2023 | Lomeli |
| 2023/0380913 | A1 | 11/2023 | Ida et al. |

FOREIGN PATENT DOCUMENTS

| | | | | |
|---|---|---|---|---|
| CA | 2808757 | A1 | 9/2013 | |
| CA | 2927381 | C * | 7/2018 | ............ A61B 34/25 |
| CN | 109288591 | B | 12/2021 | |
| CN | 109419524 | B | 11/2022 | |
| EP | 1294285 | A1 | 3/2003 | |
| EP | 2289452 | A2 | 3/2011 | |
| EP | 2289453 | A2 | 3/2011 | |
| EP | 2289454 | A2 | 3/2011 | |
| EP | 2046538 | B1 | 12/2011 | |
| EP | 1887961 | B1 | 1/2012 | |
| EP | 2414137 | A2 | 2/2012 | |
| EP | 2471484 | A2 | 7/2012 | |
| EP | 3395282 | A1 | 10/2018 | |
| JP | 2012518453 | A | 8/2012 | |
| JP | 2017529116 | A | 10/2017 | |
| JP | 2023026382 | A | 2/2023 | |
| WO | WO-0197694 | A1 | 12/2001 | |
| WO | WO-2007030173 | A1 | 3/2007 | |
| WO | WO-2008002830 | A2 | 1/2008 | |
| WO | WO-2010097719 | A1 | 9/2010 | |
| WO | WO-2010117684 | A1 | 10/2010 | |
| WO | WO-2010117685 | A2 | 10/2010 | |
| WO | WO-2011122032 | A1 | 10/2011 | |
| WO | WO-2016007595 | A1 | 1/2016 | |
| WO | WO-2016162789 | A3 | 11/2016 | |
| WO | WO-2016207628 | A1 | 12/2016 | |
| WO | WO-2017114834 | A1 | 7/2017 | |
| WO | WO-2017151752 | A1 | 9/2017 | |
| WO | WO-2017151999 | A1 | 9/2017 | |
| WO | WO-2018005842 | A1 | 1/2018 | |
| WO | WO-2018032083 | A1 | 2/2018 | |
| WO | WO-2018052966 | A1 | 3/2018 | |
| WO | WO-2018118411 | A1 | 6/2018 | |
| WO | WO-2018175094 | A1 * | 9/2018 | ............ G06T 7/68 |
| WO | WO-2018195216 | A1 * | 10/2018 | ............ A61B 34/10 |
| WO | WO-2018213489 | A1 * | 11/2018 | ............ A61B 90/11 |
| WO | WO-2020198302 | A1 | 10/2020 | |
| WO | WO-2024145414 | A1 | 7/2024 | |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
International Preliminary report on patentability for Application No. PCT/2020/015653, mailed Aug. 12, 2021, 9 pages.
Carbone M. et al., "Proof of Concept: Wearable Augmented Reality Video SeeThrough Display for Neuro-Endoscopy", International Conference on Financial Cryptography and Data Security, Jul. 14, 2018, 11 pages.
Extended European Search Report for Application No. EP22166192. 9, mailed on Jun. 28, 2022, 9 pages.
Extended European Search Report for Application No. EP23208156. 2, mailed on Apr. 10. 2024, 09 pages.
Hedayati H., et al., "Improving Collocated Robot Teleoperation with Augmented Reality," Human-Robot Interaction, ACM, Feb. 26, 2018, pp. 78-86.
International Preliminary Report on Patentability for Application No. PCT/US2019/057961, mailed on May 6, 2021,08 pages.
International Preliminary Report on Patentability for Application No. PCT/US2019/057962, mailed on May 6, 2021,07 pages.
International Search Report and Written Opinion for Application No. PCT/US2019/057961, mailed on Feb. 7, 2020. 10 pages.

(56) References Cited

OTHER PUBLICATIONS

International Search Report and Written Opinion for Application No. PCT/US2019/057962, mailed on Jan. 24, 2020, 9 pages.
Qian L., et al., "ARssist: augmented reality on a head-mounted display for the first assistant in robotic surgery," Healthcare Technology Letters, Sep. 2018, vol. 5 (5), pp. 194-200.
Trevisan D.G., et al., "Augmented Vision for Medical Applications," Proceedings ACM SAC, Mar. 16, 2008, pp. 415-1419.

* cited by examiner

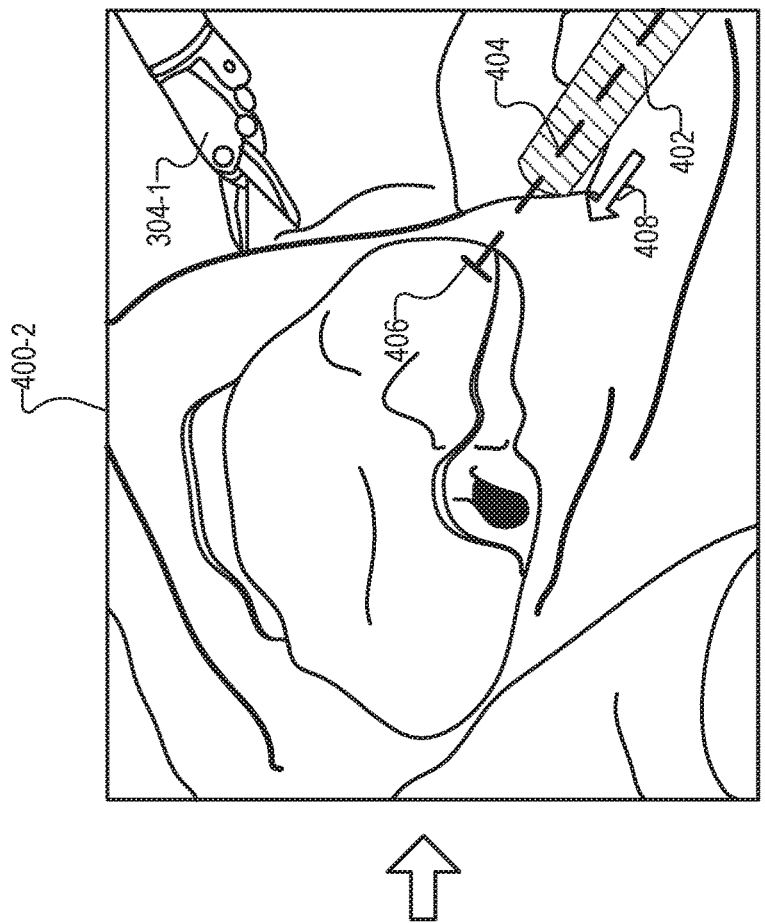
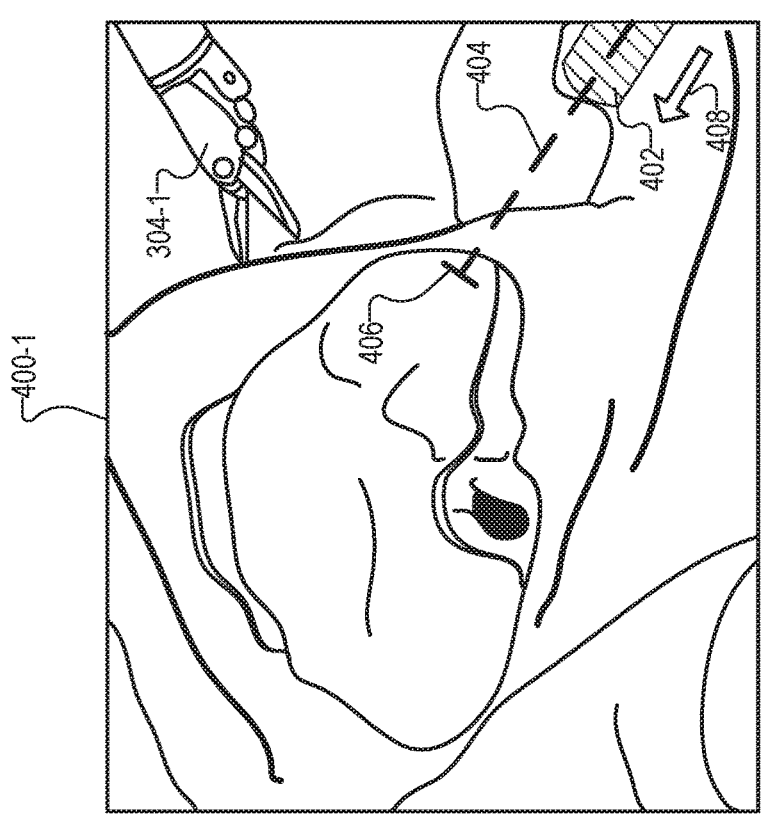
Fig. 4A
Fig. 4B

SYSTEMS AND METHODS FOR FACILITATING INSERTION OF A SURGICAL INSTRUMENT INTO A SURGICAL SPACE

RELATED APPLICATIONS

The present application is a U.S. National Stage Application under 35 U.S.C. § 371 of International Application No. PCT/US2020/015653, filed on Jan. 29, 2020, which claims priority to U.S. Provisional Patent Application No. 62/799,258, filed on Jan. 31, 2019, the contents of which are hereby incorporated by reference in their entirety.

BACKGROUND INFORMATION

A computer-assisted surgical system allows a surgeon to control surgical instruments to perform a surgical procedure on a patient. For a minimally-invasive surgery, for example, surgical instruments are inserted into a patient through one or more cannulas. The surgical instruments typically include an imaging device (e.g., an endoscope) that captures images of a surgical space and one or more surgical tools that are manipulated by the computer-assisted surgical system to perform a surgical procedure. A surgeon views the captured images of the surgical space and uses master controls of the computer-assisted surgical system to control movement of the surgical instruments to perform the surgical procedure.

During the surgical procedure, a guided tool change feature may be used to facilitate inserting a surgical instrument at a predefined position within the surgical space. However, such a guided tool change feature may not be available in certain instances. For example, a user may operate a clutch associated with the computer-assisted surgical system during the surgical procedure, which results in the guided tool change feature being disabled. In such instances, the field of view of the imaging device may be adjusted to visualize an opening through which the surgical instrument will be inserted within the surgical space. However, such visualization of the opening from within the surgical space is technically challenging. Moreover, difficulties in visualizing the opening can cause delay if the surgeon has to spend significant time adjusting the field of view to find the opening, can cause patient harm if the insertion trajectory of the surgical instrument being inserted is not cleared of anatomy and is not visualized, can obscure and/or interrupt the surgical space, and/or can result in a collision between the surgical instrument being inserted and one or more additional surgical instruments already inserted within the surgical space.

SUMMARY

An exemplary system includes a processor and a memory communicatively coupled to the processor and storing instructions executable by the processor to determine an insertion trajectory that a surgical instrument is predicted to follow when inserted into a surgical space and provide, for display by a display device, an image that depicts a portion of the surgical space captured by an imaging device and at least a portion of a representation of the insertion trajectory in the surgical space.

An additional exemplary system includes a processor and a memory communicatively coupled to the processor and storing instructions executable by the processor to determine an insertion trajectory that a surgical instrument is predicted to follow when inserted into a surgical space, provide, for display by a display device, an image that depicts a portion of the surgical space captured by an imaging device and at least a portion of a representation of the insertion trajectory in the surgical space, and prevent the surgical instrument from being inserted into the surgical space along the insertion trajectory until a determination has been made that the imaging device has been used to view an opening through which the insertion tool is to be inserted.

An exemplary method includes determining, by an insertion trajectory visualization system, an insertion trajectory that a surgical instrument is predicted to follow when inserted into a surgical space and providing, by the insertion trajectory visualization system and for display by a display device, an image that depicts a portion of the surgical space captured by an imaging device and at least a portion of a representation of the insertion trajectory in the surgical space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4A-9 illustrate exemplary images of a portion of a surgical space that include one or more virtual representations of surgical instruments according to principles described herein.

DETAILED DESCRIPTION

Systems and methods for facilitating insertion of a surgical instrument into a surgical space are described herein. As will be described in more detail below, an exemplary system includes a memory that stores instructions and a processor communicatively coupled to the memory and configured to execute the instructions. The instructions executed by the processor direct the processor to determine an insertion trajectory that the surgical instrument is predicted to follow when inserted into a surgical space and provide, for display by a display device (e.g., a display monitor, a stereoscopic image viewer, a virtual or augmented reality headset, etc.), an image that depicts a portion of the surgical space captured by an imaging device (e.g., an endoscope) and at least a portion of the representation of the insertion trajectory in the surgical space.

Various advantages and benefits are associated with the systems and methods described herein. For example, by providing a representation of the insertion trajectory for display to a user (e.g., a surgeon and/or another user associated with a surgical procedure) of a computer-assisted surgical system as described herein, an insertion trajectory visualization system allows the user to quickly and easily view the trajectory that the surgical instrument is predicted to follow when the surgical instrument is inserted into the surgical space (e.g., without the user having to spend significant time searching for an opening through which the surgical instrument will enter the surgical space). This in turn allows the user to adjust the insertion trajectory of the surgical instrument to avoid contacting anatomy and/or to avoid colliding with one or more other surgical instruments already inserted within the surgical space. In addition, the systems and methods described herein may include features that encourage and/or require the user to use the representation of the insertion trajectory to view an opening through which the surgical instrument will be inserted, which promotes safe surgical practices. These and other benefits that may be realized by the systems and methods described herein will be evident from the disclosure that follows.

Figure 1:
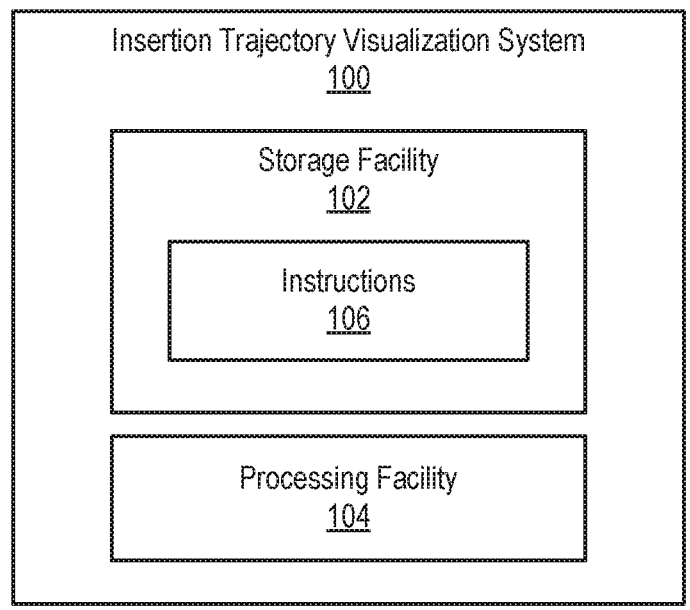
FIG. 1 illustrates an exemplary insertion trajectory visualization system according to principles described herein.

FIG. 1 illustrates an exemplary insertion trajectory visualization system 100 ("system 100"). As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

Storage facility 102 may maintain (e.g., store) executable data used by processing facility 104 to perform any of the operations described herein. For example, storage facility 102 may store instructions 106 that may be executed by processing facility 104 to perform any of the operations described herein. Instructions 106 may be implemented by any suitable application, software, code, and/or other executable data instance.

Storage facility 102 may also maintain any data received, generated, managed, used, and/or transmitted by processing facility 104. For example, as will be described below in more detail, storage facility 102 may maintain kinematics data, surgical instrument model data, surgical instrument insertion data, representation data, and the like.

Processing facility 104 may be configured to perform (e.g., execute instructions 106 stored in storage facility 102 to perform) various processing operations associated with providing a representation of an insertion trajectory for display by a display device. For example, processing facility 104 may determine an insertion trajectory that the surgical instrument is predicted to follow when inserted into a surgical space. When the insertion trajectory extends into a field of view of an imaging device, processing facility 104 may provide, for display by a display device, an image that depicts a portion of the surgical space captured by the imaging device and a representation of the insertion trajectory inserted into the surgical space along the insertion trajectory that the surgical instrument is predicted to follow when inserted into the surgical space. These and other operations that may be performed by processing facility 104 are described herein.

In some implementations, system 100 (e.g., processing facility 104) may operate as part of or in conjunction with a computer-assisted surgical system. As such, an exemplary computer-assisted surgical system will now be described. The described exemplary computer-assisted surgical system is illustrative and not limiting. System 100 may operate as part of or in conjunction with the computer-assisted surgical system described herein and/or with other suitable computer-assisted surgical systems.

Figure 2:
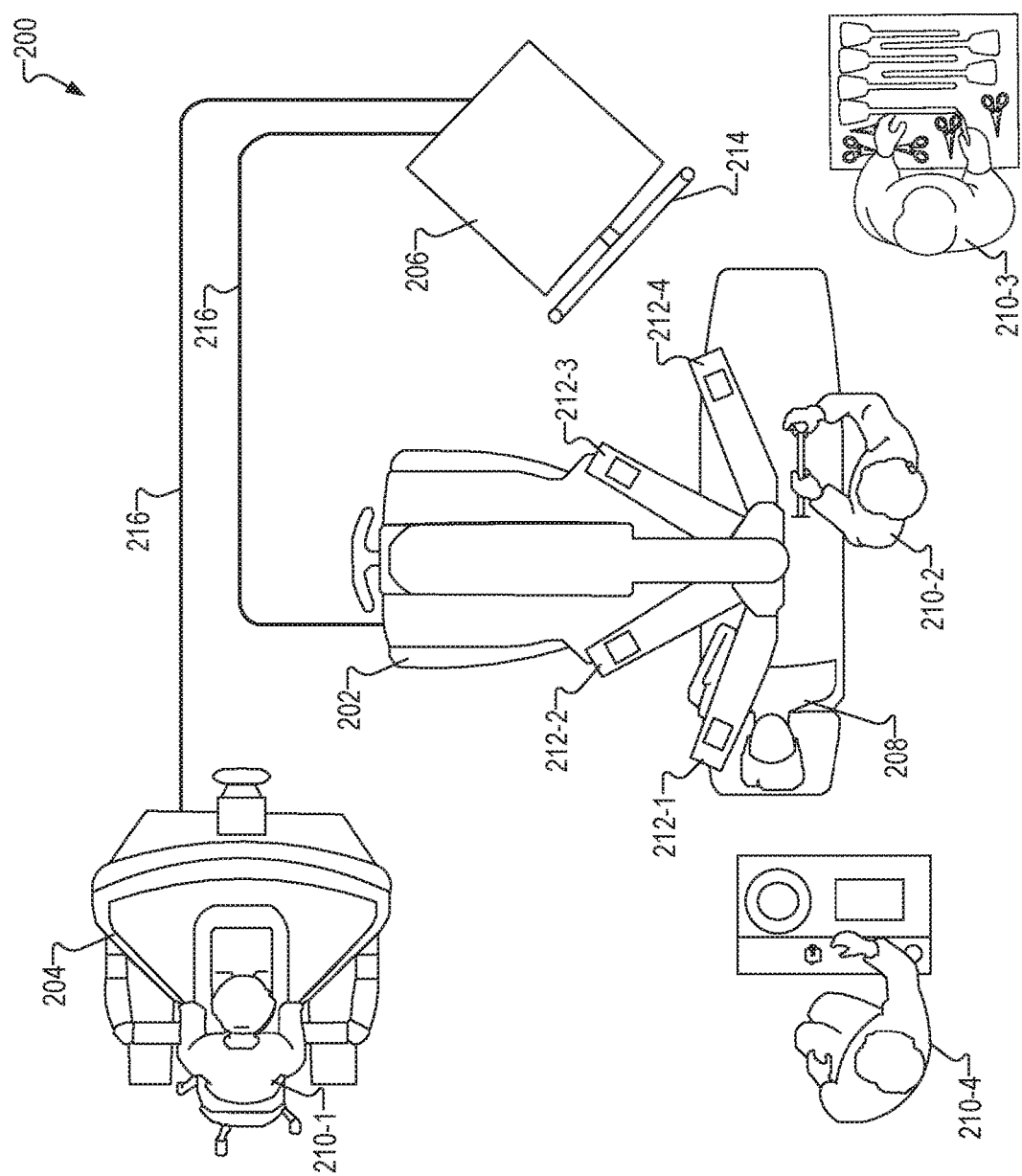
FIG. 2 illustrates an exemplary computer-assisted surgical system according to principles described herein.

FIG. 2 illustrates an exemplary computer-assisted surgical system 200 ("surgical system 200"). As shown, surgical system 200 may include a manipulating system 202, a user control system 204, and an auxiliary system 206 communicatively coupled one to another. In some examples, system 100 may be implemented by one or more of these components.

Surgical system 200 may be utilized by a surgical team to perform a computer-assisted surgical procedure on a patient 208. As shown, the surgical team may include a surgeon 210-1, an assistant 210-2, a nurse 210-3, and an anesthesiologist 210-4, all of whom may be collectively referred to as "surgical team members 210." Additional or alternative surgical team members may be present during a surgical session as may serve a particular implementation.

While FIG. 2 illustrates an ongoing minimally invasive surgical procedure, surgical system 200 may similarly be used to perform open surgical procedures or other types of surgical procedures that may similarly benefit from the accuracy and convenience of surgical system 200. Additionally, it will be understood that the surgical session throughout which surgical system 200 may be employed may not only include an operative phase of a surgical procedure, as is illustrated in FIG. 2, but may also include preoperative, postoperative, and/or other suitable phases of the surgical procedure. A surgical procedure may include any procedure in which manual and/or instrumental techniques (e.g., teleoperated instrumental techniques) are used on a patient to investigate, diagnose, or treat a physical condition of the patient. Additionally, a surgical procedure may include any procedure that is not performed on a live patient, such as a calibration procedure, a training procedure, and an experimental or research procedure.

As shown in FIG. 2, manipulating system 202 may include a plurality of manipulator arms 212 (e.g., manipulator arms 212-1 through 212-4) to which a plurality of surgical instruments (not shown) may be coupled. Each surgical instrument may be implemented by any suitable surgical tool (e.g., a tool having tissue-interaction functions), medical tool, monitoring instrument (e.g., an imaging device such as an endoscope), sensing instrument (e.g., a force-sensing surgical instrument), diagnostic instrument, or the like that may be used for a computer-assisted surgical procedure (e.g., by being at least partially inserted into patient 208 and manipulated to perform a computer-assisted surgical procedure on patient 208). While manipulating system 202 is depicted and described herein as including four manipulator arms 212, it will be recognized that manipulating system 202 may include only a single manipulator arm 212 or any other number of manipulator arms as may serve a particular implementation.

Manipulator arms 212 and/or surgical instruments attached to manipulator arms 212 may include one or more displacement transducers, orientational sensors, and/or positional sensors (hereinafter "surgical system sensors") used to generate raw (i.e., uncorrected) kinematics information. One or more components of surgical system 200 may be configured to use the kinematics information to track (e.g., determine positions of) and/or control the surgical instruments.

In addition, manipulator arms 212 may each include or otherwise be associated with a plurality of motors that control movement of manipulator arms 212 and/or the surgical instruments attached thereto. For example, manipulator arm 212-1 may include or otherwise be associated with a first internal motor (not explicitly shown) configured to yaw manipulator arm 212-1 about a yaw axis. In like manner, manipulator arm 212-1 may be associated with a second internal motor (not explicitly shown) configured to drive and pitch manipulator arm 212-1 about a pitch axis. Likewise, manipulator arm 212-1 may be associated with a third internal motor (not explicitly shown) configured to slide manipulator arm 212-1 along insertion axis. Manipulator arms 212 may each include a drive train system driven by one or more of these motors in order to control the pivoting of manipulator arms 212 in any manner as may serve a particular implementation. As such, if a surgical instrument attached, for example, to manipulator arm 212-1 is to be mechanically moved, one or more of the motors coupled to the drive train may be energized to move manipulator arm 212-1.

In certain examples, manipulator arms 212 may have one or more clutch modes that facilitate manipulator arms 212 being disengaged from one or more of the motors of manipulator arms 212. Manipulator arms 212 may have any suitable number of clutch modes as may serve a particular implementation. For example, a first clutch mode may be engaged to allow manipulator arm 212-1 to manually rotate about a yaw axis, a second clutch mode may be engaged to allow manipulator arm 212-1 to manually rotate about a pitch axis, and a third clutch mode may be engaged to allow manipulator arm 212-1 to manually move along an insertion axis. Any suitable number of the clutch modes may be engaged at a particular time to facilitate a user manually repositioning an insertion trajectory of surgical instruments attached to manipulator arms 212.

Surgical instruments attached to manipulator arms 212 may each be positioned at a surgical space associated with a patient. A "surgical space" may, in certain examples, be entirely disposed within a patient and may include an area within the patient at or near where a surgical procedure is planned to be performed, is being performed, or has been performed. For example, for a minimally invasive surgical procedure being performed on tissue internal to a patient, the surgical space may include the tissue, anatomy underlying the tissue, as well as space around the tissue where, for example, surgical instruments being used to perform the surgical procedure are located. In other examples, a surgical space may be at least partially disposed external to the patient at or near where a surgical procedure is planned to be performed, is being performed, or has been performed on the patient. For instance, surgical system 200 may be used to perform an open surgical procedure such that part of the surgical space (e.g., tissue being operated on) is internal to the patient while another part of the surgical space (e.g., a space around the tissue where one or more surgical instruments may be disposed) is external to the patient. A surgical instrument may be referred to as being positioned or located at or within a surgical space when at least a portion of the surgical instrument (e.g., a distal portion of the surgical instrument) is located within the surgical space.

User control system 204 may be configured to facilitate control by surgeon 210-1 of manipulator arms 212 and surgical instruments attached to manipulator arms 212. For example, surgeon 210-1 may interact with user control system 204 to remotely move or manipulate manipulator arms 212 and the surgical instruments. To this end, user control system 204 may provide surgeon 210-1 with imagery (e.g., high-definition three-dimensional (3D) imagery) of a surgical space associated with patient 208 as captured by an imaging device. In certain examples, user control system 204 may include a stereoscopic image viewer having two displays where stereoscopic images (e.g., 3D images) of a surgical space associated with patient 208 and generated by a stereoscopic imaging system may be viewed by surgeon 210-1. Surgeon 210-1 may utilize the imagery to perform one or more procedures with one or more surgical instruments attached to manipulator arms 112.

To facilitate control of surgical instruments, user control system 204 may include a set of master controls (not shown). These master controls may be manipulated by surgeon 210-1 to control movement of surgical instruments (e.g., by utilizing robotic and/or teleoperation technology). The master controls may be configured to detect a wide variety of hand, wrist, and finger movements by surgeon 210-1. In this manner, surgeon 210-1 may intuitively perform a surgical procedure using one or more surgical instruments.

User control system 204 may further be configured to facilitate control by surgeon 210-1 of other components of surgical system 200. For example, surgeon 210-1 may interact with user control system 204 to change a configuration or operating mode of surgical system 200, to change a display mode of surgical system 200, to generate additional control signals used to control surgical instruments attached to manipulator arms 212, to facilitate switching control from one surgical instrument to another, to initiate display of a representation of an insertion trajectory, or to perform any other suitable operation. To this end, user control system 204 may also include one or more input devices (e.g., foot pedals, buttons, switches, etc.) configured to receive input from surgeon 210-1.

Auxiliary system 206 may include one or more computing devices configured to perform primary processing operations of surgical system 200. The one or more computing devices included in auxiliary system 206 may control and/or coordinate operations performed by various other components (e.g., manipulating system 202 and/or user control system 204) of surgical system 200. For example, a computing device included in user control system 204 may transmit instructions to manipulating system 202 by way of the one or more computing devices included in auxiliary system 206. As another example, auxiliary system 206 may receive, from manipulating system 202, and process image data representative of imagery captured by an imaging device attached to one of manipulator arms 212.

In some examples, auxiliary system 206 may be configured to present visual content to surgical team members 210 who may not have access to the images provided to surgeon 210-1 at user control system 204. To this end, auxiliary system 206 may include a display monitor 214 configured to display one or more user interfaces, such as images (e.g., 2D images) of the surgical space, information associated with patient 208 and/or the surgical procedure, and/or any other visual content as may serve a particular implementation. For example, display monitor 214 may display images of the surgical space together with additional content (e.g., representations of insertion trajectories, graphical content, contextual information, etc.) concurrently displayed with the images. In some embodiments, display monitor 214 is implemented by a touchscreen display with which surgical team members 210 may interact (e.g., by way of touch gestures) to provide user input to surgical system 200.

Manipulating system 202, user control system 204, and auxiliary system 206 may be communicatively coupled one to another in any suitable manner. For example, as shown in FIG. 2, manipulating system 202, user control system 204, and auxiliary system 206 may be communicatively coupled by way of control lines 216, which may represent any wired or wireless communication link as may serve a particular implementation. To this end, manipulating system 202, user control system 204, and auxiliary system 206 may each include one or more wired or wireless communication interfaces, such as one or more local area network interfaces, Wi-Fi network interfaces, cellular interfaces, etc.

Figure 3:
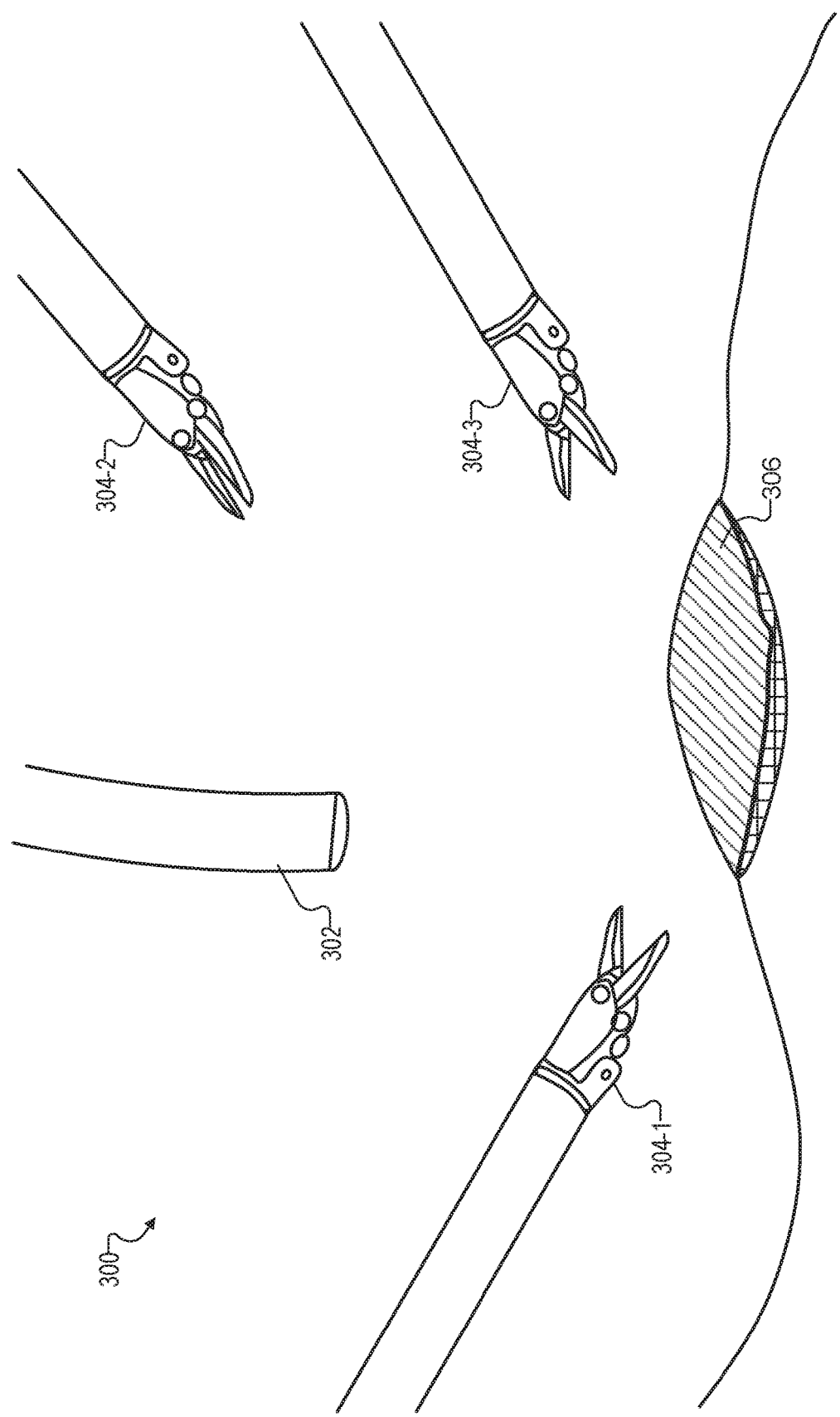
FIG. 3 illustrates a view of surgical instruments within a surgical space according to principles described herein.

FIG. 3 illustrates a view 300 that includes various surgical instruments that may be coupled to manipulator arms 212 of surgical system 200 and provided within a surgical space. As shown, the surgical instruments may include an imaging device 302 and one or more other surgical instruments 304 (e.g., surgical instruments 304-1 through 304-3) in the form of one or more surgical tools. While FIG. 3 shows one imaging device 302 and three surgical tools located at the surgical space, any number, type, and/or combination of imaging devices and surgical tools may be at the surgical space during a surgical session. For example, other types of surgical tools (e.g., diagnostic tools, therapeutic tools, etc.) different than those shown in FIG. 3 may additionally or alternatively be provided within the surgical space during the surgical procedure in certain implementations. Tissue 306 represents anatomical tissue at the surgical space.

Imaging device 302 may capture imagery at the surgical space. Any of surgical instruments 304 and/or tissue 306 that are within a field of view of imaging device 302 may be depicted in the imagery captured by imaging device 302.

Imaging device 302 may provide data representing visible light data of a surgical space. For example, imaging device 302 may capture visible light images of the surgical space that represent visible light sensed by imaging device 302. Visible light images may include images that use any suitable color and/or grayscale palette to represent a visible light-based view of the surgical space.

Imaging device 302 may also provide data representing depth data of a surgical space or data that may be processed to derive depth data of the surgical space. For example, imaging device 302 may capture images of the surgical space that represent depth sensed by imaging device 302. Alternatively, imaging device 302 may capture images of the surgical space that may be processed to derive depth data of the surgical space. The depth information may be represented as depth images (e.g., depth map images obtained using a Z-buffer that indicates distance from imaging device 302 to each pixel point on an image of a surgical space), which may be configured to visually indicate depths of objects in the surgical space in any suitable way, such as by using different greyscale values to represent different depth values. Images captured by an imaging device (e.g., by imaging device 302) and/or derived from images captured by the imaging device (e.g., visible light images and depth images) may be used to facilitate insertion of a surgical instrument in a surgical space, such as described herein.

During a surgical session, a surgical instrument (e.g., one of surgical instruments 304 and/or some other surgical instrument) may need to be inserted or reinserted into the surgical space. To facilitate such insertion of a surgical instrument into the surgical space, system 100 is configured to provide a representation of an insertion trajectory so a user (e.g., surgeon 210-1, assistant 210-2, etc.) can see the insertion trajectory that the surgical instrument is predicted to follow prior to the surgical instrument being inserted into the surgical space.

To that end, system 100 is configured to determine an insertion trajectory that the surgical instrument is predicted to follow, System 100 may determine the insertion trajectory in any suitable manner and using any suitable information associated with the surgical instrument. For example, system 100 may determine the insertion trajectory based on kinematics of a manipulator arm (e.g., manipulator arm 212-1) to which the surgical instrument is coupled. The kinematics of manipulator arms 212 may be defined by kinematics data that may be representative of a position, a pose, and/or an orientation of a component of surgical system 200 and/or a component coupled to surgical system 200. For example, kinematics data may be representative of a position, a pose, and/or an orientation of manipulator arm 212-1 and/or a surgical instrument coupled to manipulator arm 212-1.

Additionally or alternatively, system 100 may determine the insertion trajectory based on captured image data (e.g., one or more images captured by one or more imaging devices provided within the surgical space and/or outside of the surgical space) of a manipulator arm coupled to a surgical instrument. The captured image data may show a position, a pose, and/or an orientation of the manipulator arm with respect to the surgical space. System 100 may process the captured image data in any suitable manner to determine the insertion trajectory that the surgical instrument is predicted to follow when entering the surgical space.

Additionally or alternatively, system 100 may determine the insertion trajectory based on a last-known position of the surgical instrument when inserted within the surgical space. System 100 may determine the last-known position in any suitable manner. For example, system 100 may utilize surgical instrument insertion data that includes information indicating a previous position, a previous pose, and/or a previous orientation of the surgical instrument within the surgical space to determine the insertion trajectory the surgical instrument is predicted to follow.

A determination of the predicted insertion trajectory by system 100 includes system 100 determining a location of the predicted insertion trajectory of the surgical instrument with respect to the surgical space. For example, system 100 may generate a 3D coordinate space representative of the surgical space (e.g., of the entire surgical space or a portion of the surgical space). System 100 may generate the 3D coordinate space representative of the surgical space in any suitable way. For example, kinematics data and/or imaging data captured by one or more imaging devices may be used by system 100 to generate the 3D coordinate space representative of the surgical space, such as by registering the kinematics data and the imaging data to a common 3D coordinate system. The registration may include registering the predicted insertion trajectory of the surgical instrument to the 3D coordinate space representative of the surgical space.

To illustrate one example, imaging device 302 may capture imagery that includes visible light data and depth data associated with the surgical space. Based on the captured imagery, system 100 may generate a 3D coordinate space representative of the surgical space. System 100 may map the predicted insertion trajectory of a surgical instrument to the 3D coordinate space, which mapping may be used in any suitable manner, such as described herein, to facilitate insertion of the surgical instrument into a surgical space.

In an alternative example, system 100 may access kinematics data that indicates a pose, a position, and/or an orientation of a manipulator arm to which a surgical instrument is coupled. Based on the kinematics data, system 100 may generate a 3D coordinate space representative of the surgical space. System 100 may map, in any suitable manner, imagery captured by imaging device 302 to the 3D coordinate space generated based on the kinematics data to facilitate insertion of the surgical instrument into a surgical space.

In certain alternative examples, system 100 may generate a 3D coordinate space based on a combination of imagery captured by imaging device 302 and kinematics data associated with a manipulator arm to which a surgical instrument is coupled. For example, system 100 may initially generate a 3D coordinate space representative of the surgical space based on kinematics data in any suitable manner. Subsequent to generating the 3D coordinate space based on the kinematics data, system 100 may use imagery captured by imaging device 302 to correct, update, and/or fine tune the 3D coordinate space. For example, the 3D coordinate space generated based on the kinematics data may accurately represent the relative positions of one or more surgical instruments within the surgical space. However, the imagery captured by imaging device 302 may provide further information regarding a current position of anatomy within the surgical space. In such examples, the 3D coordinate space may be updated based on the captured imagery to accurately reflect the current position of the anatomy with respect to the relative positions of the one or more surgical instruments.

When imaging device 302 captures imagery of a portion of the surgical space during the surgical session and the predicted insertion trajectory of the surgical instrument extends into the field of view of imaging device 302, system 100 may provide at least a portion of a representation of the insertion trajectory for display by a display device (e.g., a stereoscopic image viewer provided as part of user control system 204 and/or display monitor 214) along the predicted insertion trajectory. System 100 may provide the representation of the insertion trajectory for display along the predicted insertion trajectory in any suitable way such that the representation of the insertion trajectory is displayed together with the imagery captured by imaging device 302. In so doing, a user viewing the display device can see the insertion trajectory that the surgical instrument is predicted to follow.

As used herein, a "representation of an insertion trajectory" may correspond to any suitable image, graphic, or animation that may be used to indicate an insertion trajectory that a surgical instrument is predicted to follow when inserted into a surgical space. A representation of an insertion trajectory may have any suitable shape, size, and/or visual appearance as may serve a particular implementation. For example, a representation of an insertion trajectory may be transparent, translucent, opaque, colored, and/or patterned. In certain examples, a representation of an insertion trajectory may have a 3D appearance when displayed by the display device.

In some examples, a representation of an insertion trajectory may be a virtual representation of a surgical instrument inserted along the insertion trajectory that the surgical instrument is predicted to follow when inserted into the surgical space. In certain examples, such a virtual representation of a surgical instrument may be a realistic representation of the surgical instrument (e.g., may have the same visual appearance as the surgical instrument represented by the virtual representation). For example, if the surgical instrument to be inserted into the surgical space is a pair of surgical scissors, the virtual representation may have at least the same outline as the pair of surgical scissors. In certain examples, a virtual model (e.g., a 3D model) of the surgical instrument may be used by system 100 to create a realistic virtual representation of the surgical instrument. Such a virtual model may be generated based on surgical instrument model data stored by storage facility 102.

Alternatively, a representation of an insertion trajectory may be more schematic in nature so as to have a different visual appearance than the surgical instrument. For example, a representation of an insertion trajectory may be represented by a dotted or dashed line provided along the predicted insertion trajectory in certain implementations. Alternatively, a more schematic version of a representation of an insertion trajectory may have a generic appearance (e.g., a rod-like appearance) in certain implementations.

The visual appearance that a representation of an insertion trajectory may have in a particular implementation may be defined by representation data stored by storage facility 102. Such representation data may include any data associated with a representation of an insertion trajectory. For example, the representation data stored in storage facility 102 may indicate that the representations provided for display by system 100 are to have a particular color, size, shape, translucence, brightness, etc. In certain examples, system 100 may provide one or more user interfaces that allow a user to adjust any suitable settings associated with a representation of an insertion trajectory. For example, the one or more user interfaces may allow the user to adjust the visual appearance (e.g., color, shape, size, translucence, brightness, etc.) that a representation of an insertion trajectory will have when provided for display by a display device.

In certain examples, a representation of an insertion trajectory may be color coded to indicate a type of surgical instrument to be inserted along the predicted insertion trajectory. For example, a representation of an insertion trajectory may have a first color when representing a first type of surgical instrument and a second color different from the first color when representing a second type of surgical instrument.

A representation of an insertion trajectory may be provided for display by a display device to graphically illustrate a predicted insertion trajectory of the surgical instrument in any suitable manner. For example, the representation of an insertion trajectory may be overlaid, in any suitable manner, over imagery captured by imaging device 302 and displayed by a display device. Alternatively; imagery captured by imaging device 302 may be modified, in any suitable manner, to include a representation of an insertion trajectory prior to and/or along with the imagery being provided for display by the display device. As one example, system 100 may insert a 3D model representative of the surgical instrument at the predicted insertion trajectory within a virtual 3D coordinate space representative of the surgical area such that when a view of the surgical area is rendered and the 3D model representative of the surgical instrument at the predicted insertion trajectory is within the view being rendered, the rendering may include the 3D model as a natural part of the surgical space as represented in the 3D coordinate space. System 100 may use any suitable rendering model and/or data representative of a virtual representation of the surgical instrument in order to provide the virtual representation for display. For example, system may use any suitable 3D rendering module (e.g., Qt3D) and/or any suitable 3D file format (e.g., gITF).

In certain examples, system 100 may selectively provide a representation of an insertion trajectory for display by a subset of display devices associated with surgical system 200. For example, the representation of the insertion trajectory may overly obscure a surgical view of surgeon 210-1 when the representation of the insertion trajectory is provided for display on a stereoscopic image viewer provided with user control system 204. In such examples, the representation of the insertion trajectory may only be provided for display on display monitor 214 as opposed to being provided for display on both the stereoscopic image viewer provided with user control system 204 and display monitor 214.

In certain examples, system 100 may additionally or alternatively provide a representation of an insertion trajectory for display by one or more additional display devices (e.g., a tablet computer, a smart phone, etc.) that are not part of surgical system 200 but that are communicatively coupled to surgical system 200.

In certain examples, system 100 may provide a representation of an insertion trajectory for display in a graphical user interface that concurrently displays a plurality of different views of the surgical space captured by a plurality of different imaging devices. For example, such a graphical user interface may concurrently display a first view that includes images of the surgical space captured by imaging device 302 and a second view that includes images of the surgical space captured by an additional imaging device. In certain examples, the images captured by the additional imaging device may include images of an opening (e.g., cannula) through which a surgical instrument is to be inserted into the surgical space. Such a graphical user interface may be provided for display on the stereoscopic image viewer provided with user control system 204, on display monitor 214, and/or by any other suitable display device that may be part of surgical system 200 or communicatively coupled to surgical system 200. With such a graphical user interface, a user may not have to move an imaging device (e.g., imaging device 302) to view an opening through which a surgical instrument will be inserted into the surgical space.

System 100 may provide a representation of an insertion trajectory for display at any suitable time and/or in response to any suitable input provided by a user. For example, surgeon 210-1 may provide any suitable input through user control system 204 to initiate the representation of the insertion trajectory being displayed by a display device. Alternatively, assistant 210-2 may provide any suitable input (e.g., a touch input) by way of display monitor 214 to initiate the representation of the insertion trajectory being displayed by a display device. If the predicted insertion trajectory is not currently within the field of view of the imaging device, the user may adjust the field of view of the imaging device until the representation of the insertion trajectory is displayed by the display device. Alternatively, if the predicted insertion trajectory is currently within the field of view of the imaging device, the representation of the insertion trajectory may be provided for display by the display device.

System 100 may stop providing the representation of the insertion trajectory for display by the display device at any suitable time and/or in response to any suitable input provided by the user. For example, system 100 may detect an instruction provided by surgeon 210-1 through user control system 204 that instructs system 100 to stop displaying the representation of the insertion trajectory. Additionally or alternatively, system 100 may detect an instruction provided by assistant 210-1 or some other user through auxiliary system 206 that instructs system 100 to stop displaying the representation of the insertion trajectory. In certain examples, system 100 may automatically stop providing the representation of the insertion trajectory for display when the surgical instrument begins being inserted into the surgical space without requiring further input from a user (e.g., when a distal portion of the surgical instrument exits the cannula and enters the surgical space), In certain examples, system 100 may automatically stop providing the representation of the insertion trajectory for display when the actual surgical instrument enters into the field of view of the imaging device, or when the actual surgical instrument is at any other suitable point along the insertion trajectory. In certain examples, system 100 may automatically re-start providing the representation of the insertion trajectory for display at any suitable time. For example, system 100 may re-start providing the representation of the insertion trajectory for display if the field of view of the imaging device is changed such that the surgical instrument being inserted is no longer in the current field of view.

In certain examples, system 100 may provide an updated representation of an insertion trajectory for display by a display device. For example, while the representation of the insertion trajectory is provided for display by the display device and prior to the surgical instrument being inserted into the surgical space, a user (e.g., assistant 210-2 or some other user) may change a position of, for example, manipulator arm 212-1 to which the surgical instrument is attached. The change in position of manipulator arm 212-1 changes kinematics of manipulator arm 212-1. Based on the change in kinematics of manipulator arm 212-1, system 100 may determine an updated insertion trajectory that the surgical instrument is predicted to follow when inserted into the surgical space. System 100 may then provide, for display in real time by the display device, an updated representation of the insertion trajectory along the updated insertion trajectory that the surgical instrument is predicted to follow when inserted into the surgical space. That is, in certain examples, the representation of the insertion trajectory provided for display by the display device may move in real time in response to a user changing position of manipulator arm 212-1. This may allow the user to see in real time how changes in kinematics of manipulator arm 212-1 affect the predicted insertion trajectory. This may help the user to adjust the position of manipulator arm 212-1 beneficially for insertion of the surgical instrument (e.g., to prevent the surgical instrument from colliding with another surgical instrument and/or contacting anatomy when the surgical instrument is ultimately inserted into the surgical space).

In certain examples, system 100 may determine an insertion depth that the surgical instrument is predicted to achieve when inserted into the surgical space. System 100 may determine the insertion depth in any suitable manner. For example, system 100 may determine the insertion depth based on depth data captured by imaging device 302, based on a previous insertion depth of the surgical instrument, based on kinematics of a manipulator arm to which the surgical instrument is attached, and/or based on any other suitable information. In certain alternative examples, system 100 may determine the insertion depth based on input specifically provided by a user. For example, system 100 may be configured to facilitate a user dropping, in any suitable manner, a virtual pin to specify a position and an insertion depth that the surgical instrument will be inserted to within the surgical space. Alternatively, system 100 may automatically determine the insertion depth as being at least a predefined distance away from tissue based on depth data captured by imaging device 302. When the insertion trajectory extends into the field of view of imaging device, system 100 may provide at least a portion of the representation of the insertion trajectory to virtually represent the predicted insertion trajectory extending to the determine insertion depth (e.g., by visually representing the surgical instrument inserted into the surgical space along the predicted insertion trajectory and at the determined insertion depth).

In certain alternative examples, the representation of the insertion trajectory may extend beyond the determined insertion depth when provided for display by the display device. In so doing, system 100 may provide a visualization of the representation of the insertion trajectory in instances where the insertion trajectory extends within the field of view of the imaging device, but the determined insertion depth is not deep enough to result in the representation being provided for display within the current field of view of imaging device 302. Exemplary representations inserted along predicted insertion trajectories will now be described with reference to FIGS. 4A-9.

In FIGS. 4A-9, various exemplary virtual representations of surgical instruments and predicted insertion trajectories are depicted. It is understood that the exemplary virtual representations of surgical instruments and/or the exemplary predicted insertion trajectories may be considered as representations of insertion trajectories in certain examples. Moreover, although FIGS. 4A-9 and the accompanying description are described with reference to virtual representations of surgical instruments, it is understood that any suitable representation of an insertion trajectory, such as described herein, may be provided in the examples shown in FIGS. 4A-9 in certain implementations.

FIGS. 4A and 4B show an exemplary sequence of images 400 (e.g., images 400-1 and 400-2) of a portion of a surgical space captured by imaging device 302. The sequence of images 400 shown in FIGS. 4A and 4B illustrate an animation of a virtual representation 402 of a surgical instrument (e.g., surgical instrument 304-2) entering the surgical space within the field of view of imaging device 302. As illustrated in FIGS. 4A and 4B, virtual representation 402 is shown as entering the surgical space along a predicted insertion trajectory 404 toward a predicted insertion depth 406 in the direction of an arrow 408. Virtual representation 402 is an example of a generic rod-like representation that has a different visual appearance than the surgical instrument that is predicted to follow predicted insertion trajectory 404 when inserted into the surgical space. In the example shown in FIGS. 4A and 4B, virtual representation 402 is shown as moving along predicted insertion trajectory 404 as images 400 transition from image 400-1 shown in FIG. 4A to image 400-2 shown in FIG. 4B. In certain examples, virtual representation 402 may continue to move along predicted insertion trajectory 404 until virtual representation 402 reaches predicted insertion depth 406. Alternatively, as explained above, virtual representation 402 may extend beyond predicted insertion depth 406 in certain implementations.

In the example shown in FIGS. 4A and 4B, arrow 408, the dashed line indicating predicted insertion trajectory 404, and the line indicating predicted insertion depth 406 are shown together with virtual representation 402 to facilitate explaining how virtual representation 402 may be depicted within an image captured by imaging device 302. However, it is understood that in certain implementations, arrow 408, the dashed line indicating predicted insertion trajectory 404, and the line indicating predicted insertion depth 406 may not be provided for display within images 400 together with virtual representation 402. That is, in the example shown in FIGS. 4A and 4B, only virtual representation 402 may be provided for display within images 400 in certain examples. Alternatively, only the dashed line indicating the predicted insertion trajectory 404 may be provided for display within images 400 in certain examples.

In certain alternative examples, predicted insertion trajectory 404 may not be within a current field of view of imaging device 302. In such examples, a user may provide any suitable instruction to cause virtual representation 402 to be provided for display. For example, the user may reposition the field of view of imaging device 302 to find where virtual representation 402 is located within the surgical space. In such examples, virtual representation 402 may appear to already be inserted within the surgical space when the field of view pans to where virtual representation 402 is located as opposed to being provided for display as an animation that depicts virtual representation 402 being inserted along predicted insertion trajectory 404.

In certain examples, it may be helpful to visualize an opening through which the surgical instrument will be inserted prior to the surgical instrument being inserted into the surgical space along the predicted insertion trajectory. This may be beneficial when the predicted insertion trajectory is not clear (e.g., is obstructed with anatomy and/or one or more other surgical instruments) and/or to promote safe surgical practices. System 100 may facilitate visualization of the opening in any suitable manner. For example, a virtual representation of a surgical instrument provided for display by system 100 may be used to guide the field of view of imaging device 302 in a proximal direction of the virtual representation back towards the opening.

Figure 5:
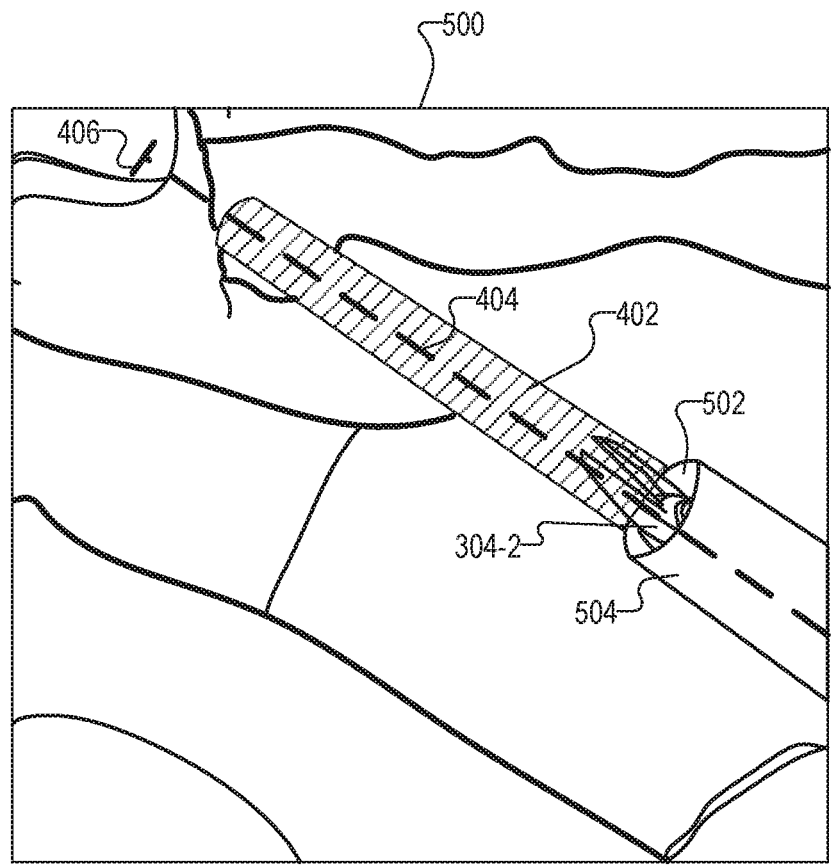

To illustrate, FIG. 5 depicts an image 500 of a portion of the surgical space captured by imaging device 302 after the field of view of imaging device 302 is moved from the field of view shown in FIGS. 4A and 4B along the length of virtual representation 402. As shown in FIG. 5, the movement of the field of view along the length of virtual representation 402 results in visualization of an opening 502 of a cannula 504 through which surgical instrument 304-2 is provided. By using virtual representation 402 as a guide, the field of view of imaging device 302 may be telemanipulated to easily and quickly locate opening 502 of cannula 504 and ensure that instrument 304-2 may be inserted into the surgical space along predicted insertion trajectory 404 safely (e.g., without contacting anatomy and/or another surgical instrument within the surgical space).

In certain examples, system 100 may prevent the surgical instrument from being inserted into the surgical space along a predicted insertion trajectory until a determination has been made that imaging device 302 has been used to visualize an opening through which the surgical tool is to be inserted. This may be accomplished in any suitable manner. For example, system 100 may cause one or more motors included in or associated with a manipulator arm (e.g., manipulator arm 212-2) to which the surgical instrument is coupled to be locked into position to prevent movement of the manipulator arm. System 100 may verify that the opening has been visualized with imaging device 302 in any suitable manner. For example, system 100 may utilize any suitable image recognition technology to determine that a cannula is included in an image captured by imaging device 302. Alternatively, system 100 may determine that imaging device 302 has visualized the opening by detecting a dedicated computer vision marker on the cannula (e.g., a bar code, color, pattern, etc. integrated on or otherwise attached to the cannula). After system 100 has determined that imaging device 302 has been used to visualize the opening, system 100 may cause the one or more motors included in or associated with the manipulator arm to be unlocked to allow the surgical instrument to be inserted along the predicted insertion trajectory.

In certain examples, system 100 may determine, in any suitable manner such as described herein, an additional insertion trajectory that an additional surgical instrument is predicted to follow when inserted into the surgical space. System 100 may provide, for display by a display device, an additional virtual representation of the additional surgical instrument inserted into the surgical space along the additional insertion trajectory that the additional surgical instrument is predicted to follow when inserted into the surgical space. In such examples, the virtual representation of the surgical instrument may be provided for display by the display device during a first time period and the additional virtual representation of the additional surgical instrument may be provided for display by the display device during a second time period that does not overlap the first time period. Alternatively, the virtual representation of the surgical instrument and the additional virtual representation of the additional surgical instrument may be provided for concurrent display by the display device.

Figure 6B:
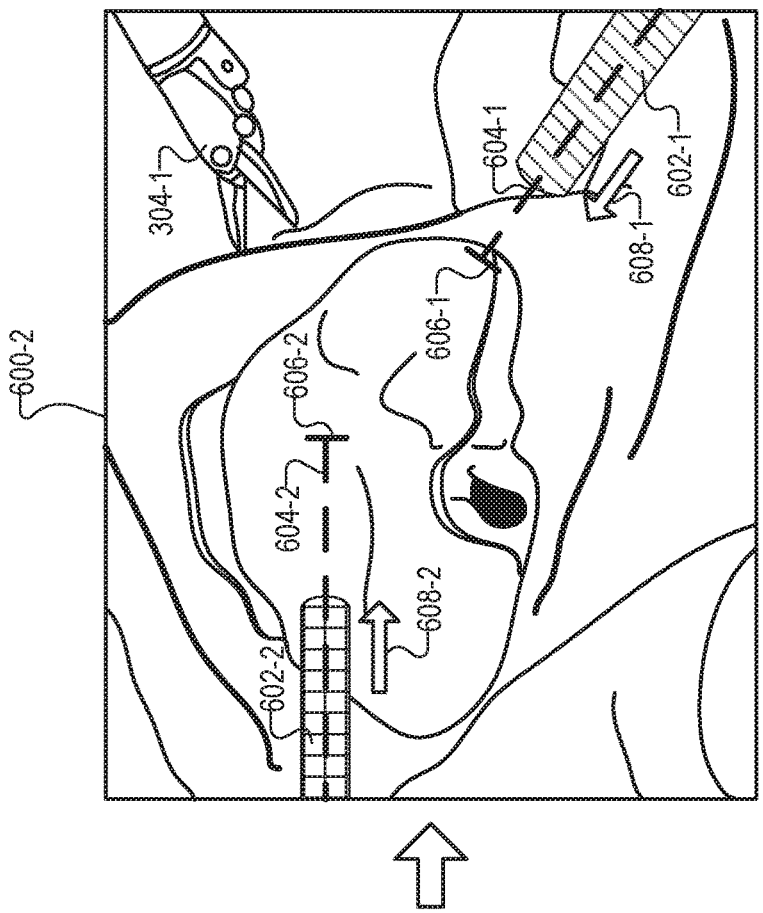
Figure 6A:
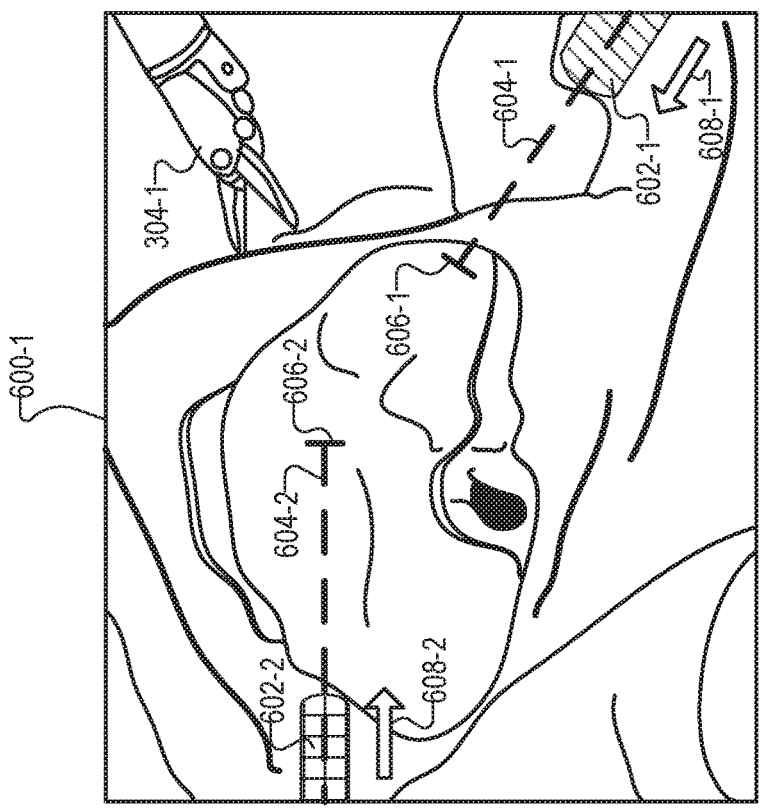

To illustrate, FIGS. 6A and 6B show an exemplary sequence of images 600 (e.g., image 600-1 and 600-2) of a portion of the surgical space captured by imaging device 302. The sequence of images 600 shown in FIGS. 6A and 6B illustrate animations of virtual representations 602 (e.g., virtual representation 602-1 and 602-2) of surgical instruments (e.g., surgical instruments 304-2 and 304-3) concurrently entering the surgical space. As shown in FIGS. 6A and 6B, virtual representation 602-1 is shown as entering the surgical space along a predicted trajectory 604-1 toward a predicted insertion depth 606-1, and virtual representation 602-2 is shown as entering the surgical space along a predicted insertion trajectory 604-2 toward a predicted insertion depth 606-2. Similar to the example shown in FIGS. 4A and 4B, imagery captured by imaging device 302 transitions from image 600-1 shown in FIG. 6A to image 600-2 shown in FIG. 6B to depict an animation of virtual representations 602-1 and 602-2 being inserted into the surgical space in the directions of arrows 608-1 and 608-2, respectively.

When virtual representations of surgical instruments are provided for concurrent display by a display device, the virtual representations may be visually different from each other in any suitable way. In the example shown in FIGS. 6A and 6B, the shading provided on virtual representations 602-1 and 602-2 is different to facilitate a user distinguishing between the two.

Figure 7B:
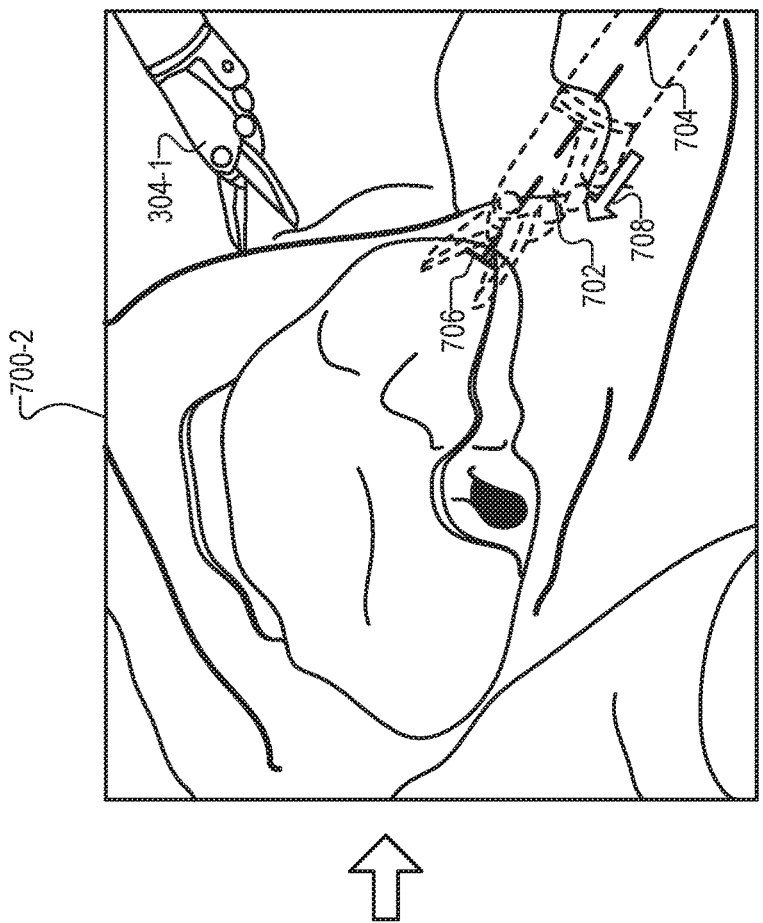
Figure 7A:
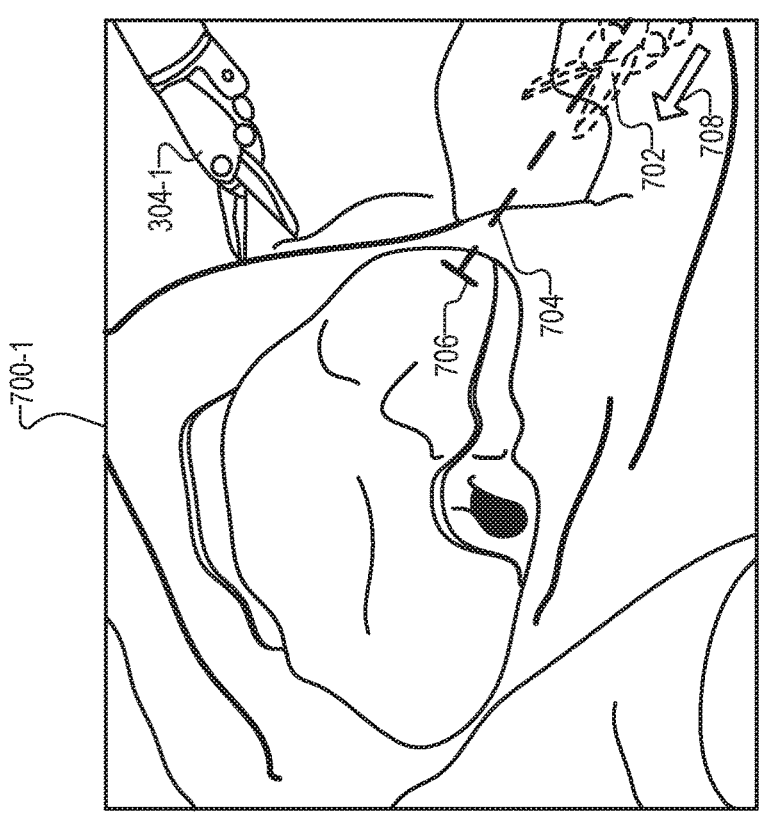

FIGS. 7A and 7B show an exemplary sequence of images 700 (e.g., images 700-1 and 700-2) of a portion of the surgical space captured by imaging device 302 and that may be provided for display when a virtual representation of a surgical instrument has a relatively more realistic visual appearance. As shown in FIGS. 7A and 7B, a virtual representation 702 of a surgical instrument is shown as being inserted along a predicted insertion trajectory 704 towards a predicted insertion depth 706 in the direction of arrow 708. In the example shown in FIGS. 7A and 7B, virtual representation 702 has a similar outline as surgical instrument 304-2 but is shown in dashed lines to indicate that virtual representation 702 is at least partially transparent, which facilitates a user distinguishing virtual representation 702 from actual surgical instrument 304-2.

In certain examples, system 100 may determine that the insertion trajectory that a surgical instrument is predicted to follow is not clear (e.g.; an object such as another surgical instrument and/or anatomy may be obstructing the predicted insertion trajectory). This may be accomplished in any suitable manner. For example, system 100 may utilize one or more depth sensors included in imaging device 302 and/or one or more other surgical instruments 304 to determine, for example, that an additional surgical instrument and/or anatomy is within the predicted insertion trajectory. Additionally or alternatively, system 100 may utilize kinematics data associated with the additional surgical instrument to determine that the additional surgical instrument is within the predicted insertion trajectory. In certain examples, system 100 may provide one or more notifications to facilitate preventing a surgical instrument from contacting anatomy and/or another surgical instrument that is in the way of the predicted insertion trajectory. For example, system 100 may provide, for display by the display device together with the virtual representation of the surgical instrument, a notification indicating that the surgical instrument is predicted to contact the additional surgical instrument if inserted along the insertion trajectory that the surgical instrument is predicted to follow. Such a notification may have any suitable shape or form and may be provided for display at any suitable location within the image captured by imaging device 302.

Figure 8:
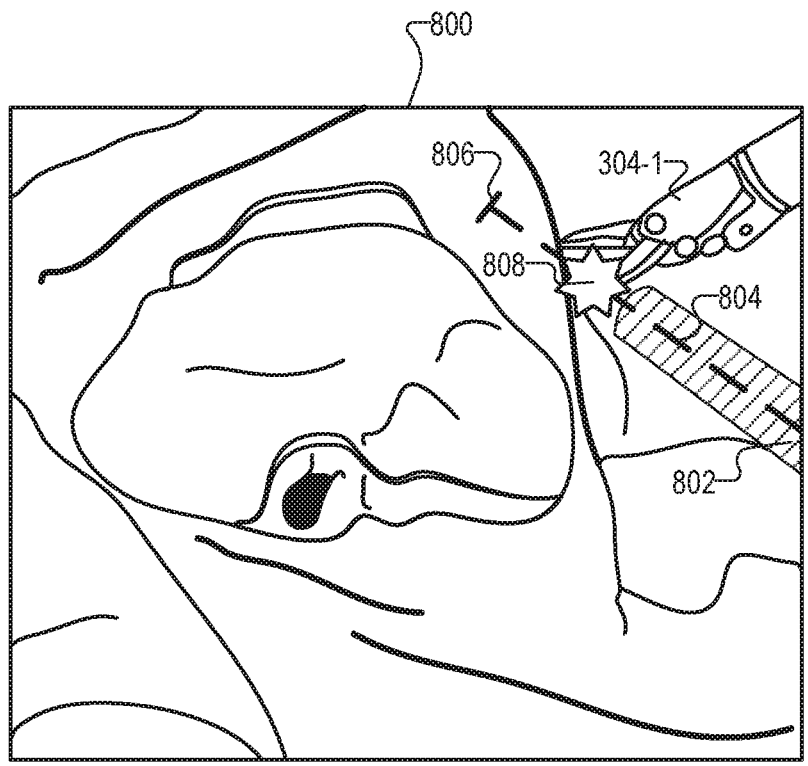

To illustrate, FIG. 8 shows an image 800 of a portion of the surgical space captured by imaging device 302. As shown in FIG. 8, a virtual representation 802 of a surgical instrument is depicted as entering the surgical space along a predicted insertion trajectory 804 towards a predicted insertion depth 806. However, because predicted insertion trajectory 804 would result in the surgical instrument represented by virtual representation 802 contacting surgical instrument 304-1, FIG. 8 includes a notification 808 to indicate that a collision is predicted to occur if the surgical instrument is inserted along predicted insertion trajectory 804. In the example shown in FIG. 8, notification 808 is provided for display along insertion trajectory 804. However, notification 808 and/or an additional notification may be provided in other locations in certain implementations. In response to notification 808, the user may then reposition surgical instrument 304-1 within the cannula and/or change the insertion depth that the surgical instrument will be inserted along insertion trajectory 804 to avoid contacting the surgical instrument 304-1.

Figure 9:
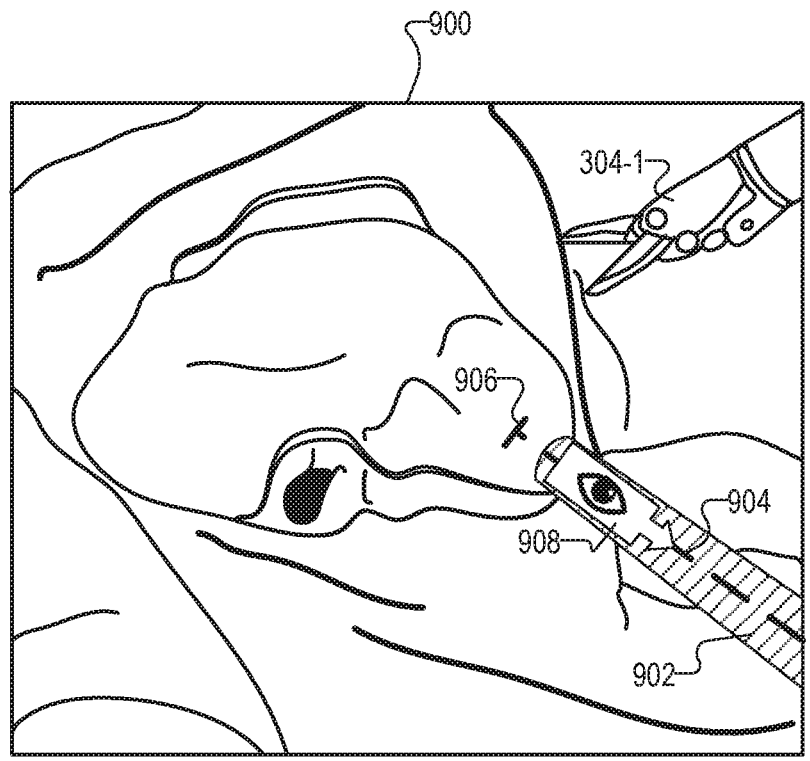

In certain examples, system 100 may be configured to provide, for display by a display device together with the virtual representation of the surgical instrument, an indicator that instructs or encourages a user to follow the predicted insertion trajectory with imaging device 302 to view an opening through which the surgical instrument will be inserted into the surgical space. Such an indicator may be provided for display in any suitable manner. For example, the indicator may be provided on top of or to the side of the virtual representation of the surgical instrument. To illustrate, FIG. 9 shows an exemplary image 900 of a portion of the surgical space captured by imaging device 302 and that includes a virtual representation 902 provided along a predicted insertion trajectory 904 towards a predicted insertion depth 906. As shown in FIG. 9, an indicator 908 is provided on top of virtual representation 902 and includes an eye icon to remind the user to adjust the field of view of imaging device 302 in order to view an opening through which the surgical instrument represented by virtual representation 902 will be inserted.

System 100 may be configured to provide an indicator such as indictor 908 for display at any suitable time and/or in response to any suitable event. In certain examples, system 100 may display indicator 908 by default together with virtual representation 902 of the surgical instrument along predicted insertion trajectory 904. In other examples, system 100 may display indicator 908 together with virtual representation 902 in response to an event such as a detection by system 100 that anatomy or another surgical instrument may obstruct predicted insertion trajectory 904.

In certain examples, system 100 may provide an indication to a user when a predicted insertion trajectory is adjusted so as to intersect a predefined position within the surgical space. For example, system 100 may determine that a user has dropped a virtual pin within the surgical space to define a specific position and insertion depth to which the surgical instrument is to be inserted. The user may engage one or more clutch modes to clutch a manipulator arm to which a surgical instrument is attached and manually move the manipulator arm to adjust the predicted insertion trajectory of the surgical instrument. While the manipulator arm is moved, system 100 may provide, for display by any suitable display device, a virtual representation of the surgical instrument that is shown as moving in real time based on the movement of the clutched manipulator arm. When the virtual representation of the surgical instrument intersects with the virtual pin dropped by the user, system 100 may provide an indication to the user. For example, system 100 may change a color, a texture, a size, and/or any other visual aspect of the virtual representation. Additionally or alternatively, system 100 may provide an indication through tactile feedback provided to the user. System 100 may provide such tactile feedback in any suitable manner. For example, while the user manually moves the manipulator arm, system 100 may cause the manipulator arm to vibrate, to resist further movement, and/or to lock into position when the virtual representation of the surgical instrument intersects with the virtual pin dropped by the user. Additionally or alternatively, system 100 may provide such tactile feedback through the master controls provided with user control system 204. For example, the master controls provided with user control system 204 may vibrate and/or provide any other suitable type of tactile feedback when the virtual representation of the surgical instrument intersects with the virtual pin dropped by the user. Such feedback may help the user easily determine when the manipulator arm is positioned such that the insertion trajectory will intersect the predefined position within the surgical space. After the manipulator arm is positioned, the user may then disengage the one or more clutch modes to lock the manipulator arm back in place so that the surgical instrument may be inserted into the surgical space along the insertion trajectory to the predefined position.

In certain examples, when a surgical instrument is inserted along a predicted insertion trajectory, one or more portions of the surgical instrument may be occluded when located behind or inside objects in a surgical space. Accordingly, to realistically display a representation of an insertion trajectory as virtually extending behind or inside such objects when the representation of an insertion trajectory is inserted along the predicted insertion trajectory of the surgical instrument, in certain examples, system 100 may provide, for display by a display device, only the portion or portions of the virtual representation of the insertion trajectory that are not occluded by one or more other objects in the surgical space. For example, a predicted insertion trajectory of a surgical instrument may extend behind another surgical instrument located in the surgical space. Additionally or alternatively, the predicted insertion trajectory of the surgical instrument (e.g., a distal portion thereof) may extend into tissue in the surgical space. In such examples, system 100 may provide, for display by a display device, only the portion(s) of a virtual representation of the insertion trajectory (e.g., a virtual representation of a surgical instrument) that are not occluded by other objects in the surgical space. In so doing, system 100 may be configured to realistically represent a virtual representation of an insertion trajectory as extending behind and/or within one or more objects in the surgical space while the virtual representation of the insertion trajectory is inserted along the predicted insertion trajectory.

While the exemplary virtual representations of surgical instruments described herein are provided in the context of surgical instrument insertion, it is understood that principles such as those described herein may also be applied in other contexts to facilitate visualization of surgical instruments within a surgical space. For example, a virtual representation of a surgical instrument may, in certain implementations, indicate a position of a portion of or all of a surgical instrument already inserted into the surgical space. In such examples, a virtual representation of the surgical instrument may depict a portion of the surgical instrument that is provided behind tissue and/or another surgical instrument within the surgical space.

Figure 10:
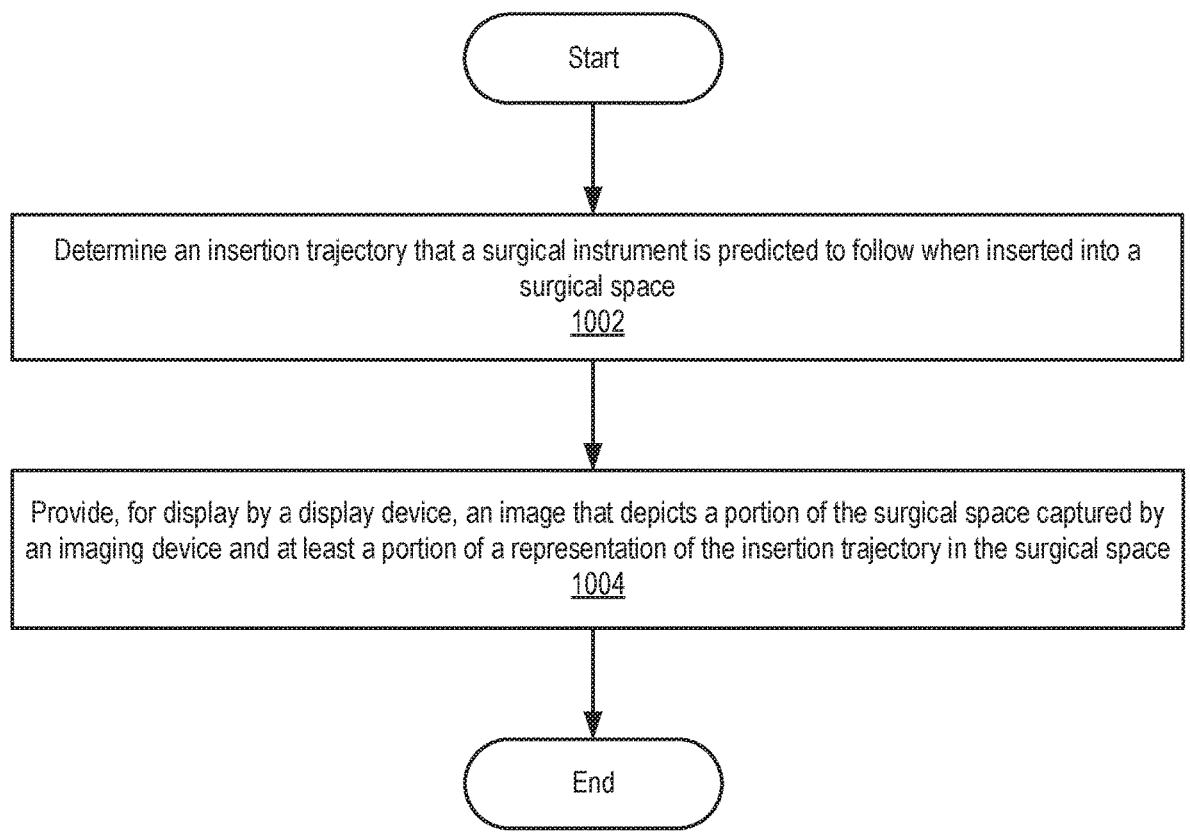
FIG. 10 illustrates an exemplary method for facilitating insertion of a surgical instrument into a surgical space according to principles described herein.

FIG. 10 illustrates an exemplary method for facilitating insertion of a surgical instrument into a surgical space. While FIG. 10 illustrates exemplary operations according to one embodiment, other embodiments may omit, add to, reorder, and/or modify any of the operations shown in FIG. 10. One or more of the operations shown in FIG. 10 may be performed by a system such as system 100, any components included therein, and/or any implementation thereof.

In operation 1002, a system (e.g., insertion trajectory visualization system 100) may determine an insertion trajectory that the surgical instrument is predicted to follow when inserted into a surgical space. Operation 1002 may be performed in any of the ways described herein.

In operation 1004, the system may provide, for display by a display device, an image that depicts a portion of the surgical space captured by an imaging device and at least a portion of a representation of the predicted insertion trajectory in the surgical space (e.g., a virtual representation of a surgical instrument inserted into the surgical space along the insertion trajectory that the surgical instrument is predicted to follow when inserted into the surgical space). As described herein, in certain examples, the representation of the insertion trajectory is provided for display when the insertion trajectory extends into a field of view of the imaging device. If the insertion trajectory does not extend within the current field of view of the imaging device, the field of view of the imaging device may be adjusted in any suitable manner until the representation of the insertion trajectory is viewable within the image captured by the imaging device. Operation 1004 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
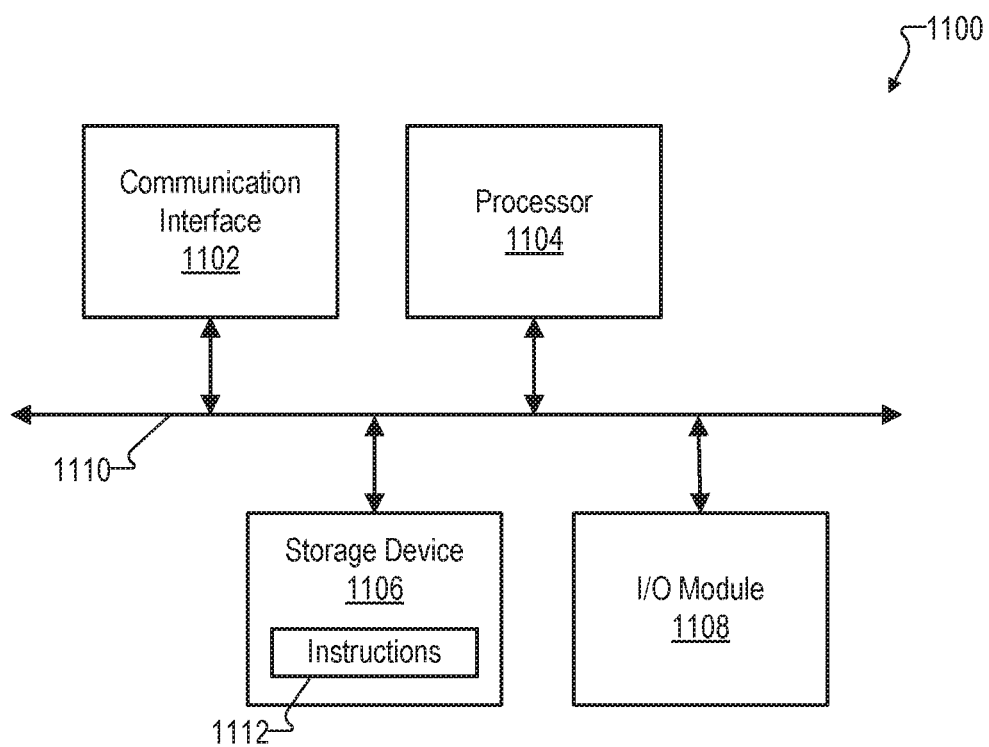
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1100. For example, storage facility 102 may be implemented by storage device 1106, and processing facility 104 may be implemented by processor 1104.

To the extent the aforementioned embodiments collect, store, and/or employ personal information provided by individuals, it should be understood that such information may be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled to the memory and configured to execute the instructions to:
determine, based on a surgical instrument coupled to a robotic manipulator arm of a computer-assisted surgical system, an insertion trajectory that the surgical instrument is positioned to follow when inserted into a surgical space;
provide, for display by a display device, an image that depicts a portion of the surgical space captured by an imaging device and at least a portion of a representation of the insertion trajectory in the surgical space;
determine, based on kinematics data indicative of at least one of a pose, a position, or an orientation of the robotic manipulator arm, that the insertion trajectory that the surgical instrument is predicted to follow would result in the surgical instrument contacting an object that is in the surgical space and that represents an obstruction to be avoided;
provide, for display by the display device and together with the representation of the insertion trajectory, an indication of the obstruction of the insertion trajectory by the object in the surgical space;
in response to at least one of the pose, the position, or the orientation of the robotic manipulator arm being changed, determine an updated insertion trajectory; and
control the robotic manipulator arm to move the surgical instrument along the updated insertion trajectory.

2. The system according to claim 1, wherein the representation of the insertion trajectory is a virtual representation of the surgical instrument, the virtual representation of the surgical instrument having a same visual appearance as the surgical instrument.

3. The system according to claim 1, wherein the representation of the insertion trajectory includes an animation depicting the representation of the insertion trajectory entering the surgical space within a field of view of the imaging device along the insertion trajectory.

4. The system according to claim 1, wherein the processor is further configured to execute instructions to:

determine an insertion depth that the surgical instrument is predicted to achieve when inserted into the surgical space; and provide, for display by the display device, the representation of the insertion trajectory inserted into the surgical space at the determined insertion depth and along the insertion trajectory.

5. The system according to claim 1, wherein the processor is further configured to execute instructions to:

determine an insertion depth that the surgical instrument is predicted to achieve when inserted into the surgical space; and provide, for display by the display device, the representation of the insertion trajectory inserted into the surgical space along the insertion trajectory and beyond the determined insertion depth.

6. The system according to claim 1, wherein the processor is further configured to execute instructions to:

provide, for display by the display device together with the representation of the insertion trajectory, an indicator that instructs a user to follow the insertion trajectory with the imaging device to view an opening through which the surgical instrument will be inserted into the surgical space.

7. The system according to claim 1, wherein the processor is further configured to execute instructions to:

determine, based on an additional surgical instrument, an additional insertion trajectory that the additional surgical instrument is positioned to follow when inserted into the surgical space; and provide, for display by the display device together with the image that depicts the portion of the surgical space captured by the imaging device, at least a portion of an additional representation of the additional insertion trajectory in the surgical space.

8. The system according to claim 7, wherein the representation of the insertion trajectory is provided for display by the display device during a first time period and the additional representation of the additional insertion trajectory is provided for display by the display device during a second time period that does not overlap the first time period.

9. The system according to claim 7, wherein the representation of the insertion trajectory and the additional representation of the additional insertion trajectory are provided for concurrent display by the display device together with the image that depicts the portion of the surgical space.

10. The system according to claim 7, wherein the representation of the insertion trajectory is visually different from the additional representation of the additional insertion trajectory.

11. The system according to claim 1, wherein:

the object is an additional surgical instrument that is already inserted within the surgical space;

the processor is further configured to execute instructions to determine that the insertion trajectory that the surgical instrument is positioned to follow would result in the surgical instrument contacting the additional surgical instrument that is already inserted into the surgical space; and the indication indicates that the surgical instrument is positioned to contact the additional surgical instrument if inserted along the insertion trajectory that the surgical instrument is positioned to follow.

12. The system according to claim 11, wherein the indication indicates that the surgical instrument is positioned to contact the additional surgical instrument is provided for display along the insertion trajectory.

13. The system according to claim 1, wherein the insertion trajectory is determined based on the kinematics data associated with the robotic manipulator arm to which the surgical instrument is coupled.

14. The system according to claim 1, wherein:

the display device comprises a stereoscopic image viewer configured to provide a three-dimensional (3D) image for display to a user; and the representation of the insertion trajectory is provided for display within the 3D image when the insertion trajectory extends into a field of view of the imaging device.

15. A system comprising:

a memory storing instructions; and a processor communicatively coupled to the memory and configured to execute the instructions to:

determine, based on a surgical instrument coupled to a robotic manipulator arm of a computer-assisted surgical system, an insertion trajectory that the surgical instrument is positioned to follow when inserted into a surgical space;

provide, for display by a display device, an image that depicts a portion of the surgical space captured by an imaging device and at least a portion of a representation of the insertion trajectory in the surgical space;

determine, based on kinematics data indicative of at least one of a pose, a position, or an orientation of the robotic manipulator arm, that the insertion trajectory that the surgical instrument is predicted to follow would result in the surgical instrument contacting an object that is in the surgical space and that represents an obstruction to be avoided;

prevent the surgical instrument from being inserted into the surgical space along the insertion trajectory until a determination has been made that the imaging device has been used to view an opening through which the surgical instrument is to be inserted;

provide, for display by the display device and together with the representation of the insertion trajectory, an indication of the obstruction of the insertion trajectory by the object in the surgical space;

in response to at least one of the pose, the position, or the orientation of the robotic manipulator arm being changed, determine an updated insertion trajectory; and control the robotic manipulator arm to move the surgical instrument along the updated insertion trajectory.

16. The system of claim 15, wherein the processor is further configured to execute instructions to:

determine that the imaging device has been used to follow the representation of the insertion trajectory along the insertion trajectory and view the opening through which the surgical instrument is to be inserted; and allow, in response to the determination that the imaging device has been used to view the opening, the surgical instrument to be inserted into the surgical space along the insertion trajectory.

17. A method comprising:

determining, by an insertion trajectory visualization system and based on a surgical instrument coupled to a robotic manipulator arm of a computer-assisted surgical system, an insertion trajectory that the surgical instrument is positioned to follow when inserted into a surgical space;

providing, by the insertion trajectory visualization system and for display by a display device, an image that depicts a portion of the surgical space captured by an imaging device and at least a portion of a representation of the insertion trajectory in the surgical space;

determine, based on kinematics data indicative of at least one of a pose, a position, or an orientation of the robotic manipulator arm, that the insertion trajectory that the surgical instrument is predicted to follow would result in the surgical instrument contacting an object that is in the surgical space and that represents an obstruction to be avoided;

provide, by the insertion trajectory visualization system and for display by the display device and together with the representation of the insertion trajectory, an indication of the obstruction of the insertion trajectory by the object in the surgical space;

in response to at least one of the pose, the position, or the orientation of the robotic manipulator arm being changed, determine an updated insertion trajectory; and control the robotic manipulator arm to move the surgical instrument along the updated insertion trajectory.

18. The method according to claim 17, further comprising:

determining, by the insertion trajectory visualization system, an insertion depth that the surgical instrument is predicted to achieve when inserted into the surgical space; and providing, by the insertion trajectory visualization system and for display by the display device, the representation of the insertion trajectory inserted into the surgical space at the determined insertion depth and along the insertion trajectory.

19. The method according to claim 17, further comprising:

providing, for display by the display device together with the representation of the insertion trajectory, an indicator that instructs a user to follow the insertion trajectory with the imaging device to view an opening through which the surgical instrument will be inserted into the surgical space.

20. The method according to claim 17, wherein:

the object is an additional surgical instrument that is inserted into the surgical space;

the method further comprises determining, by the insertion trajectory visualization system, that the insertion trajectory that the surgical instrument is positioned to follow would result in the surgical instrument contacting the additional surgical instrument that is inserted into the surgical space; and the indication indicates that the surgical instrument will contact the additional surgical instrument if inserted along the insertion trajectory that the surgical instrument is positioned to follow.

* * * * *